Sept. 13, 1966   J. L. DWYER ETAL   3,271,999
APPARATUS FOR DETERMINING THE SILTING PROPERTIES OF LIQUIDS
CONTAINING MINUTE SUSPENDED PARTICLES
Filed May 1, 1963

INVENTORS
JAMES L. DWYER
ROBERT F. CONNELLY
BY Kenway, Jenney & Hildreth
ATTORNEYS United States Patent Office 3,271,999
Patented Sept. 13, 1966

1

3,271,999
APPARATUS FOR DETERMINING THE SILTING PROPERTIES OF LIQUIDS CONTAINING MINUTE SUSPENDED PARTICLES
James L. Dwyer, South Lincoln, Mass., and Robert F. Connelly, Temple City, Calif., assignors to Millipore Filter Corporation, Bedford, Mass., a corporation of Massachusetts
Filed May 1, 1963, Ser. No. 277,234
7 Claims. (Cl. 73—61)

Our invention relates to the measurement of fluid properties, and particularly to novel apparatus for determining the silting properties of fluids in which small particles or stable gels are suspended.

The effects of small amounts of minute particles, or of stable gels, suspended in a fluid, on apparatus or material to which the fluid may be exposed, have become increasingly important. For example, the performance of modern hydraulic servomechanisms, such as those used in aircraft, missiles, and the like, are seriously degraded, and the useful life of the mechanisms greatly shortened, even by particles in the hydraulic fluid whose size is on the order of microns. As another example, the wash water used in the semiconductor and television tube industries, as in the manufacture of solid state devices and cathode ray tubes, must be freed meticulously of particulate contamination to avoid damage to the critical faces of these devices. And the presence of minute particles in oil well water, used for injection in oil-bearing strata, causes plugging of the strata before the full benefits of water injection have been attained. These, and other similar problems in the use of fluids which may contain suspended particles in amounts too small to see or measure directly, require for their solution apparatus effective to detect the presence and concentration of particles in the size range of ½ to 100 microns. Optical methods, involving counting with the aid of a microscope the particles deposited on a filter by predetermined volume of fluid, are effective for the larger particles in this range, but are impractical for the detection of particles below about 5 microns in size. Other methods, depending upon such effects as light scattering, the reflection of ultrasonic energy, sedimentation, and changes in dielectric properties have been devised, and are effective under the proper conditions. However, these methods are generally costly and difficult to carry out, and the evaluation of the data obtained is not always a straightforward procedure. It is the object of our invention to facilitate the detection and measurement of particles in the 0.5 to 5.0 micron size range, without the use of complex and expensive equipment or the need for tedious calculation in the reduction of data.

Our invention makes use of the discovery that the degree of particulate contamination of a fluid, and hence its silting properties, can be determined by measuring a function of its properties which will be referred to as the silting index of the fluid. We have found that this function, which is proportional to the resistance to flow of the fluid through a filter, is a reproducible index of the degree of contamination of the fluid by particles in the size range of 0.5 to 5.0 microns, and can be used effectively to predict the effect of these particles on apparatus or materials exposed to the fluid. The measurement of this function is carried out with the use of the

2 novel apparatus of our invention, which comprises a simple and effective means for measuring, as a function of time, the flow rate of a sample of fluid to be evaluated through a filtration element having a microporous surface of predetermined size and characteristics. The nature and characteristics of the microporous filtration element are of paramount importance in the measurement of the silting index of a fluid. When a suspension of particles is filtered through a microporous surface, the particles are retained on the filter's surface. The large particles form a coarse, thin packing on the filter surface and offer almost no resistance to fluid flow. The extremely small particles pass through the filter and so do not impede flow. Those particles that are of a size near that of the pore size of the filter tend to plug the filter and offer a substantial resistance to flow. Thus, if (1) the pore size of the filter approximates the particulate fraction that one wishes to detect, and (2) the distribution range of the pore diameters of the filter is very small one can selectively determine the presence of certain size particles present in a liquid. We have found that the presence of particles in the 0.5 to 5.0 micron size range is effectively determined by utilizing a filter material having a pore size of 0.8 micron.

Briefly, the apparatus of our invention comprises a conduit of constant cross section, which is preferably transparent and graduated at prescribed intervals to mark the flow of fluid therethrough. Means are provided for applying a constant pressure to a sample of fluid in the conduit. One end of the conduit is connected to a valve which is operable to connect it to a source of fluid to be tested, to close it, or to connect it to a filter holder in which a filtration element having a uniformly microporous surface of predetermined area and pore size is mounted, blocking the path of flow from the conduit to particles which will not pass through the pores of the surface or which are entrapped by particles already deposited on the filter. This apparatus, used in conjunction with a timing device in a manner described below, makes possible a rapid and accurate determination of the silting index of a fluid, and is especially effective for the determination of the silting index of fluids containing particles in the size range of 0.5 to 5.0 microns.

The apparatus of our invention will best be understood in the light of the following detailed description, together with the accompanying drawing, of a preferred embodiment thereof. In the drawing.

Figure 1:
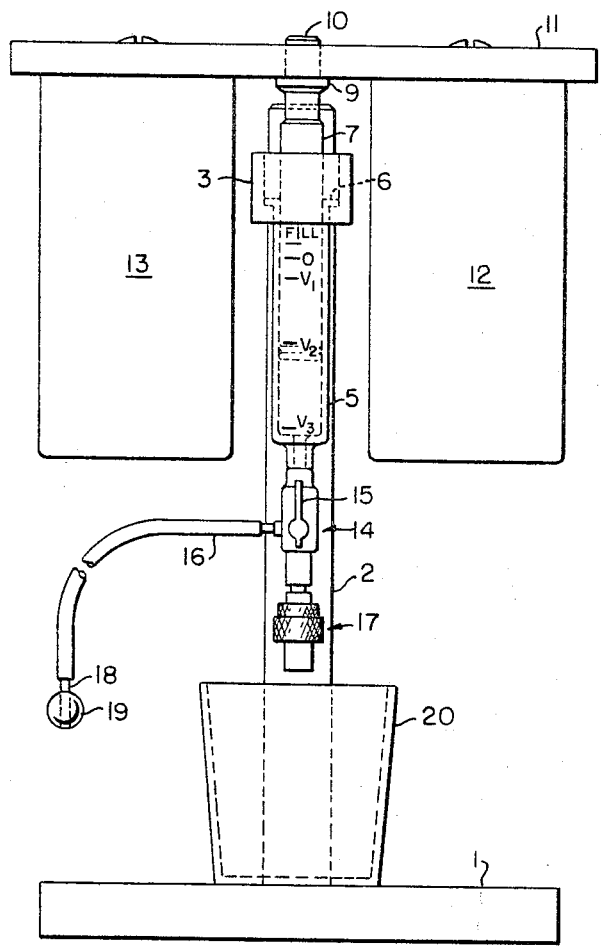
FIG. 1 is a front view of the flow measuring apparatus of our invention.
Figure 2:
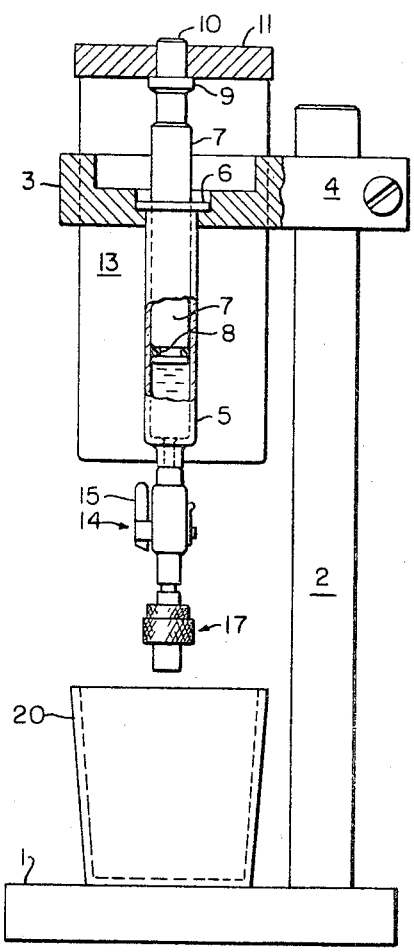
FIG. 2 is a side view of the apparatus of FIG. 1, with parts broken away and parts shown in cross section.

Referring now to the drawing, the apparatus of our invention is supported by a suitable stand, comprising a base plate 1 and an upright supporting column 2 affixed thereto. A transverse supporting arm 3 is frictionally secured to the column 2 by conventional means, such as the clamp part 4. As shown in FIGS. 1 and 2, the arm 3 is recessed to receive a conduit having a region of constant area, here shown as a graduated cylinder 5, made of glass, quartz glass, or the like, and provided at its upper end with a supporting flange 6. In accordance with a preferred embodiment of our invention, the cylinder 5 is provided with five graduations, marked "Fill," O, $V_1$, $V_2$ and $V_3$. The "Fill" mark is located a short distance above the O mark to facilitate the beginning of a timing cycle, and the mark $V_1$ is located near enough to the O mark so that a sample of fluid in the cylinder will still be filtering essentially like a clean fluid when the meniscus of the sample reaches this mark. The mark $V_3$ is twice as far from the O mark as is the mark $V_2$, so that these marks are separated by equal cylinder volumes.

A plunger 7, of suitable non-corrosive material such as stainless steel or the like, is received within the cylinder 5 and is recessed at its lower end to receive a sealing O-ring 8, of any suitable conventional flexible rubber or plastic material selected to be unaffected by the fluid to be evaluated.

The plunger 7 is provided at the top with a support flange 9 and a reduced extension 10 for removably supporting a plate 11, of metal or the like, to which are secured metal weights 12 and 13, the latter being of equal size and located at equal distances from the center of the plate to exert equal and opposite moments about the support provided by the plunger 7.

The outlet end of the cylinder 5 is connected, in any suitable conventional manner, to a conventional three-way valve 14. The valve is provided with an operating arm 15, which can be moved to a first position, in which the cylinder 5 is connected to an inlet tube 16 and the outlet port of the valve 14 is shut off, a second position in which the inlet tube 16 is shut off and the cylinder 5 is connected to an outlet port to which a filter holder 17 is attached, and a third position in which the outlet passage of the cylinder 5 is cut off.

Figure 3:
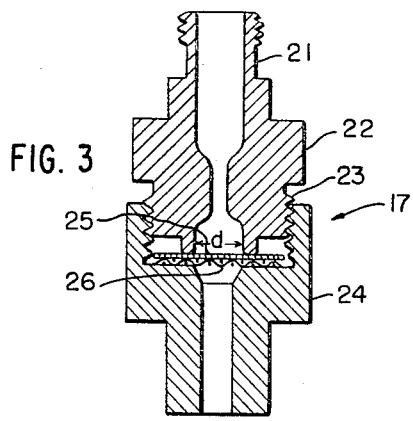
FIG. 3 is a cross section elevation view of a filter holder which comprises a part of the apparatus of FIGS. 1 and 2.

The filter holder 17 is attached to the outlet end of the valve 14 is best shown in FIG. 3. This holder may be secured to the outlet port of the valve in any conventional manner, as by threads formed on the upper end 21 of the holder 17 and engaging mating threads formed in the valve port, by a conventional quick release connection, or the like. As shown in FIG. 3, the upper portion of the holder 17 is provided with an enlarged portion 22, which may be knurled as shown in FIG. 1, and the lower portion of the holder is provided with an enlarged portion 24, which may also be knurled, to facilitate engaging and disengaging threads 23, formed on the parts, to install or remove a filter 25. The filter 25 may comprise a conventional plastic microporous membrane filter, such as the Millipore AAWP 013 00 filter, a product of the Millipore Filter Corporation, preferably having pores of about 0.8 micron for the best sensitivity to particles in the size range of 0.5 to 5.0 microns. Larger or smaller pore sizes may be employed, if needed, to provide a convenient clogging rate in the apparatus for fluids containing larger or smaller particles. The filter is supported by a stainless steel screen 26, which is perforated to permit a relatively free flow of the contaminated fluid. For example, in one practical embodiment of our invention, a stainless steel screen having 22 percent porosity provided by .006 inch diameter holes, and being .006 inch thick, was employed. The diameter $d$ of the bores of the holder 17 determines the effective area of the filter, and in practice it is desirable to provide several holders 17 having bores of different diameter so that the area of the filter may be adjusted to provide a range of results for fluids of different characteristics.

As shown in FIG. 1, the inlet tube 16, which may be made of rubber, plastic or the like, is provided at its lower end with a metal outlet tube 18, of stainless steel or the like, on which is formed an integral enlargement 19 which serves as a sinker for holding the end of the tube at the bottom of a container of fluid to be evaluated. A container 20, of any suitable material such as glass, stainless steel or the like, is provided to receive fluid emerging from the filter holder 17.

Before discussing the operation of the apparatus of FIGS. 1, 2 and 3, a theoretical explanation of the principles underlying the method of evaluating fluids which employs the apparatus of our invention will be given. It has been found that the flow of a contaminated liquid through a filter, under a constant pressure differential across the filter, can be described by the following equation:

(1) $$Q = \frac{dV}{dt} = \frac{\Delta P A}{\eta}\left[\frac{1}{r_f + r_c}\right]$$

where $Q$ = volume flow rate
$V$ = volume, cm.$^3$
$t$ = time, sec.
$\Delta P$ = pressure drop, dynes/cm.$^2$
$A$ = filter surface area, cm.$^2$
$\eta$ = viscosity, dyne-sec./cm.$^2$.

In Equation 1, $r_f$ is a parameter having the units cm.$^{-1}$ and proportional to the resistance to flow per unit area of the membrane. For a membrane of given pore size, $r_f$ is a constant. The term $r_c$ is a parameter having the same units as $r_f$, and determined by the flow resistance per unit area offered by the solid contaminants deposited on the membrane surface. During the course of filtration, the value of $r_c$ will increase. The value of $r_c$ is a function of a number of factors; for example, the contaminant particle size, particle shape, compressibility, concentration, etc. However, for a given contaminant, it can be expressed as follows:

(2) $$r_c = \frac{VS}{A}$$

where S is a dimensionless constant. The function S has been found to characterize the tendency of a given sample to clog a filter.

Rewriting Equation 1 and substituting $SV/A$ for $r_c$, we have:

(3) $$\frac{dt}{dV} = \frac{\eta}{\Delta P A}\left[r_f + \frac{VS}{A}\right]$$

By integration:

(4) $$\int_0^t dt = \frac{\eta}{\Delta P A}\int_0^V \left(r_f + \frac{VS}{A}\right)dV$$

(5) $$t = \frac{\eta}{\Delta P A}\left[r_f V + \frac{V^2 S}{2A}\right]$$

(6) $$\frac{t}{V} = \frac{\eta r_f}{\Delta P A} + \frac{\eta S V}{2\Delta P A^2}$$

A is the filter area: $A^2 = (A)^2$ (integrating Equation 4).
V is the volume of liquid filtered: $V^2 = (V)^2$.
$V_1$ is the volume of liquid filtered in time $t$.
$V_2$ is the total volume of liquid filtered in time $t_2$.
$V_3$ is the total volume of liquid filtered in time $t_3$.

Note that Equation 6 is linear in the functions $(t/V)$ and $(V)$. Filtration data on contaminated fluids, if plotted in these coordinates, should yield straight lines. The plotting of actual data has shown that contaminated fluids do indeed conform to this equation, indicating that the silting index S is a valid measure of the silting performance of a fluid.

If a perfectly clean fluid is passed through a filter, the flow rate remains constant. The quantity $(t/V)$, the total time elapsed per total volume filtered, must then remain constant. Equation 6 would then be:

(7) $$\frac{t}{V} = \text{constant} = \frac{\eta}{\Delta P A}(r_f + o)$$

The quantity S is, therefore, equal to zero for a clean fluid. For a contaminated fluid, S will be some finite positive number, and the value of $(t/V)$ will increase as more fluid is passed through the filter. The flow rate correspondingly decreases. The dirtier the fluid, the higher is the value of S.

By applying the method of simultaneous equations to Equation 6, evaluated for the particular values $V_2$, $t_2$ and $V_3$, $t_3$ of $V$ and $t$, some of the parameters may be eliminated:

$$(8a) \quad \frac{t_3}{V_3}\left(\frac{2\Delta PA}{\eta}\right) = 2r_f + \frac{SV_3}{A}$$

$$(8b) \quad \frac{t_2}{V_2}\left(\frac{2\Delta PA}{\eta}\right) = 2r_f + \frac{SV_2}{A}$$

Subtracting and rearranging we have:

$$(9) \quad S = \frac{2\Delta PA^2}{\eta}\left[\frac{\frac{t_3}{V_3} - \frac{t_2}{V_2}}{V_3 - V_2}\right]$$

In order to eliminate the measurement of viscosity and test pressure, the filtration of a contaminated fluid may be compared to that of a clean fluid. By Equation 1, the performance of a clean fluid can be written:

$$(10) \quad \frac{dV}{dt} = \frac{\Delta PA}{\eta r_f} = \text{constant} = \frac{\Delta V}{\Delta t} = \frac{V_1}{t_1}$$

Now, during the initial stage of filtration of a contaminated fluid $r_f$ is numerically much larger than $r_c$. Thus, the contaminated fluid initially tends to filter just as an uncontaminated fluid. If, then, we pick a relatively small value of $V_1$ during the course of contaminated fluid filtration, the resulting value of $(V_1/t_1)$ will be quite close to that expected from an uncontaminated fluid. Applying this ratio of $(V_1/t_1)$ to Equation 9 we have:

$$(11) \quad S\frac{t_1}{V_1} = 2Ar_f\left[\frac{\frac{t_3}{V_3} - \frac{t_2}{V_2}}{V_3 - V_2}\right]$$

This equation may be used directly to evaluate S, in conjunction with the apparatus of our invention. However, it has been found more convenient to simplify it by the introduction of relations between the constants inherent in a particular embodiment of the apparatus. For this purpose, the volume $V_3$ can be taken as any convenient constant M times the volume $V_2$. Thus, if $V_3$ is chosen equal to $2V_2$, by rearrangement of Equation 11 we have finally:

$$(12) \quad S = \left[\frac{t_3 - 2t_2}{t_1}\right]\frac{Ar_fV_1}{(V_2)^2}$$

Equation 12 is a complete equation for the determination of the contamination level of a fluid. By fixing the type of filter, the filter size, and the sample size, Equation 12 reduces to a comparison of times multiplied by a dimensional constant. It is independent of viscosity and other external variables such as pressure, temperature, etc.

In Equation 12, the resistance per unit area of the membrane $r_f$ is a constant determined by the thickness and pore diameter of the membrane filter. By measuring flow through a filter of fixed area, and using constant values of the volume $V_1$ and $V_2$, the coefficient $$\frac{Ar_fV_1}{(V_2)^2}$$

may be replaced by a constant K. This constant may be given any desired value, by suitable choice of units, so that the numerical values of S will fall in a convenient range. For ease of calculations with the apparatus described herein a value of 1.0 is assigned arbitrarily to the constant K. Thus, the equation used is:

$$(13) \quad Sj = \frac{T_3 - 2T_2}{T_1}$$

when the subscript $j$ refers to the particular size holder 17 used.

As will appear, the apparatus of FIGS. 1–3 is especially adapted for use in the measurment of S by evaluating Equation 13. For this purpose, with a clean filter in place in the holder 17, the sinker 19 is placed in a container of the fluid to be tested. With the weights removed and the valve 14 adjusted to connect the inlet tube 16 to the cylinder, the plunger 7 is raised manually to draw in a sample of fluid to the "Fill" index mark. The valve 14 is then adjusted to its closed position, and the weights are set in place. The valve handle 15 is next turned to connect the cylinder 5 to the filter holder 17, and the fluid will begin to flow through the filter under the constant pressure provided by the weights 12 and 13. When the interface between the fluid and the bottom of the plunger reaches the index marked O, a timing operation is begun. Conveniently, a conventional stop watch of the type provided with two hands, means for starting both hands simultaneously, and means for stopping each hand independently, is employed. By the use of this, or other conventional timing means, the time $t_1$ at which the bottom of the plunger reaches the index mark $V_1$, the time $t_2$ at which the bottom of the plunger reaches the index mark $V_2$, and the time $t_3$ at which the bottom of the plunger reaches the mark $V_3$ are noted and recorded. The mark $V_3$ may be located to coincide with the end of the constant area portion of the cylinder 5, or it may be located ahead of the end. In either case, the marks $V_2$ and $V_3$ are so located with respect to the zero mark that they indicate the passage of equal volume of fluid between O and $V_2$ and between $V_2$ and $V_3$, such that $V_3 = 2V_2$. The $V_1$ mark is located sufficiently past the zero mark that the time may be recorded with accuracy, and close enough to the "Fill" mark so that the filtration will still correspond to that of a clean fluid when the $V_1$ mark is reached; for example, at one-fifth of the distance from O to $V_1$.

From the recorded values of $t_1$, $t_2$ and $t_3$, the value of S for the fluid may be determined with the use of Equation 13, in which the coefficient may be taken as a constant selected to give convenient values with the filter holder employed. Filter holders of different bores $d$ may be used to analyze fluids of widely varying contamination levels so that fluids of widely varying properties may be conveniently measured in terms of a silting index.

While the embodiment of our invention just described is preferred, as it is most convenient in operation, various modifications could be made without departing from the scope of our invention in its broader aspects. For example, the silting index S may be found by measuring volumes after constant times, rather than by measuring times of flow of constant volumes, as will be apparent from an inspection of Equation 12. Many other changes and modifications will be apparent to those skilled in the art upon reading our description, and such can obviously be made without departing from the scope of our invention.

Having thus described our invention, what we claim is:

1. Apparatus for evaluating a liquid having particles therein to determine the silting properties, comprising a transparent measuring conduit of uniform cross-section for receiving the liquid having an outlet for the discharge of the liquid, a microporous filter of predetermined pore size mounted in the outlet to filter out particles having a size larger than the pores of the filter, means for applying a constant pressure to the liquid contained in the conduit to force it to flow through the filter, means for indicating the passage of successive volumes of the liquid forced to flow from the conduit and through the filter, consisting of index marks, one of said marks being the starting mark, the first mark being spaced from the starting mark to be substantially equivalent to the flow of clean liquid, the second and third marks being located so that the volume from the starting mark to the second mark is equal to the volume from the second mark to the third mark.

2. The apparatus of claim 1 in which the conduit has a uniform cross-sectional area and the means for applying constant pressure includes a plunger slidably operable in the conduit of uniform cross-sectional area and means for applying a constant force to the plunger.

3. Apparatus for measuring the silting index of a liquid, comprising a graduated cylinder of transparent material, means for supporting said cylinder in an upright position, a microporous filter of predetermined area and pore size capable of removing particles in the range of 0.5 to 5.0 microns, means for mounting said filter below said cylinder in the path of liquid flowing therethrough, means for applying a uniform pressure on the upper surface of the liquid to force it through the filter, and four index marks near the cylinder for measuring the passage of successive volumes of liquid through the filter, one of said marks being the starting mark, the first mark being spaced from the starting mark to be substantially equivalent to the flow of clean liquid, the second and third marks being located so that the volume from the starting mark to the second mark is equal to the volume from the second mark to the third mark.

4. Apparatus for measuring the silting index of a liquid, comprising a graduated cylinder of transparent material, means for supporting said cylinder in an upright position, a microporous filter of predetermined area and pore size, means for mounting said filter below said cylinder in the path of liquid flowing therethrough, a plunger slidably operable in said cylinder and sealing it against the upward flow of liquid, a weight mounted on said plunger which applies a constant pressure on the liquid to force it through the filter, and index marks being located for measuring the passage of successive volumes of liquid through the filter at precise time periods, one of said marks being the starting mark, the first mark being spaced from the starting mark to be substantially equivalent to the flow of clean liquid, the second and third marks being located so that the volume from the starting mark to the second mark is equal to the volume from the second mark to the third mark.

5. Apparatus for measuring the silting index of a liquid, comprising a transparent cylinder having a graduated section of constant cross section with an outlet passage at one end and a plunger in the cylinder closing its other end, means for mounting the cylinder in an upright position with the plunger at the top, a weight removably mounted on the plunger, valve means comprising first, second and third ports and actuating means operable to at least three positions, one in which the first port is connected to the second port, one in which the first port is connected to the third port, and one in which the first port is closed, means connecting the first port to the outlet passage of the cylinder, an inlet tube connected to the second port, a microporous membrane filter, means for mounting said filter in the path of fluid flowing through said third port and index marks being located for measuring the passage of successive volumes of liquid through the filter at precise time periods, one of said marks being the starting mark, the first mark being spaced from the starting mark to be substantially equivalent to the flow of clean liquid, the second and third marks being located so that the volume from the starting mark to the second mark is equal to the volume from the second mark to the third mark.

6. Apparatus for determining the silting properties of a liquid comprising a frame, a transparent cylinder uprightly mounted on said frame, a plunger in said cylinder, means for applying a constant force to said plunger, a filter support housing secured to the discharge end of said cylinder, a microporous filter having a pore size of 0.8 micron supported in said filter support housing in the path of fluid discharged from said cylinder upon movement of said plunger and index marks being located for measuring the passage of successive volumes of liquid through the filter at precise time periods, one of said marks being the starting mark, the first mark being spaced from the starting mark to be substantially equivalent to the flow of clean liquid, the second and third marks being located so that the volume from the starting mark to the second mark is equal to the volume from the second mark to the third mark.

7. An apparatus for evaluating a liquid containing suspended particles in the size range of 0.5 to 5.0 microns, comprising a transparent conduit having a region of constant cross section, an inlet end and an outlet end, a microporous surface having a precise and uniform pore size connected across said outlet end, means for applying a constant pressure to a liquid in said conduit, first index means on said conduit in said first region and registrable with the meniscus of a liquid in said first region to indicate the beginning of a period during which the liquid is forced through the filter by said pressure applying means, and second, third and fourth index means on said conduit in the first region between said first index means and said outlet end registrable with the meniscus of a liquid in said first region to indicate the passage of first, second and third volumes of liquid through said filter, the distance to the second index means being substantially equivalent to the flow of clean liquid, the third and fourth index means being located so that the volume from the first index means to the third index means is equal to the volume from the third index means to the fourth index means.

References Cited by the Examiner

UNITED STATES PATENTS

| | | | |
|---|---|---|---|
| 2,000,579 | 5/1935 | Carpenter et al. | 73—61 |
| 2,187,514 | 1/1940 | Gardner | 73—61 |
| 2,659,433 | 11/1953 | Brown | 73—38 X |
| 3,172,286 | 3/1965 | Grubb et al. | 73—53 |

FOREIGN PATENTS 289,500  10/1931  Italy.

DAVID SCHONBERG, *Primary Examiner.*